United States Patent
Kwan et al.

(10) Patent No.: US 7,643,420 B2
(45) Date of Patent: Jan. 5, 2010

(54) METHOD AND SYSTEM FOR TRANSMISSION CONTROL PROTOCOL (TCP) TRAFFIC SMOOTHING

(75) Inventors: Bruce H. Kwan, Sunnyvale, CA (US); Puneet Agarwal, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 610 days.

(21) Appl. No.: 11/187,404

(22) Filed: Jul. 21, 2005

(65) Prior Publication Data

US 2006/0203728 A1 Sep. 14, 2006

Related U.S. Application Data

(60) Provisional application No. 60/673,898, filed on Apr. 22, 2005.

(51) Int. Cl.
*H04J 1/16* (2006.01)
(52) U.S. Cl. .................................................. 370/235
(58) Field of Classification Search ................. None
See application file for complete search history.

(56) References Cited

U.S. PATENT DOCUMENTS

| | | | |
|---|---|---|---|
| 6,965,941 B2* | 11/2005 | Boucher et al. | 709/230 |
| 6,996,070 B2* | 2/2006 | Starr et al. | 370/252 |
| 7,162,630 B2* | 1/2007 | Sperry et al. | 713/153 |
| 7,373,500 B2* | 5/2008 | Ramelson et al. | 713/150 |
| 7,376,755 B2* | 5/2008 | Pandya | 709/250 |
| 7,460,473 B1* | 12/2008 | Kodama et al. | 370/230 |
| 2004/0037319 A1 | 2/2004 | Pandya | |

FOREIGN PATENT DOCUMENTS

EP 1 469 653 A2 10/2004

OTHER PUBLICATIONS

Ang, An Evaluation of an Attempt at Offloading TCP/IP Protocol Processing onto an i90RN-based iNIC, Hewllett-Parkard, 33 pages, Jan. 2001.*

* cited by examiner

*Primary Examiner*—Frank Duong
(74) *Attorney, Agent, or Firm*—McAndrews, Held & Malloy

(57) ABSTRACT

Various aspects of a method and system for transmission control protocol (TCP) traffic smoothing are presented. Traffic smoothing may comprise a method for controlling data transmission in a communications system that further comprises scheduling the timing of transmission of information from a TCP offload engine (TOE) based on a traffic profile. Traffic smoothing may comprise transmitting information from a TOE at a rate that is either greater than, approximately equal to, or less than, the rate at which the information was generated. Some conventional network interface cards (NIC) that utilize TOEs may not provide a mechanism that enables traffic shaping. By not providing a mechanism for traffic shaping, there may be a greater probability of lost packets in the network.

18 Claims, 17 Drawing Sheets

METHOD AND SYSTEM FOR TRANSMISSION CONTROL PROTOCOL (TCP) TRAFFIC SMOOTHING

CROSS-REFERENCE TO RELATED APPLICATIONS/INCORPORATION BY REFERENCE

This application makes reference to, claims priority to, and claims the benefit of U.S. Provisional Application Ser. No. 60/673,898 filed Apr. 22, 2005.

The application makes reference to:
U.S. application Ser. No. 10/651,459 filed Aug. 29, 2003; and
U.S. Provisional Application Ser. No. 60/661,064 filed Mar. 11, 2005.

The above referenced applications are hereby incorporated herein by reference in their entirety.

FIELD OF THE INVENTION

Certain embodiments of the invention relate to communication networks. More specifically, certain embodiments of the invention relate to a method and system for transmission control protocol (TCP) traffic smoothing.

BACKGROUND OF THE INVENTION

In some conventional network interface cards (NIC) installed in end stations, applications that utilize long lived information flows may transmit information for extended periods of time. An end station may also be referred to as a terminal. The information may be transmitted, via a network, between a transmitting terminal and a receiving terminal. The network may comprise a plurality of communications media and communications devices that facilitate the transfer of information between a transmitting terminal and a receiving terminal. Information may be transmitted via a network in structures that may be variously referred to as messages, packets, or frames. The method for transmitting the structure, that comprises the information, may be referred to as a protocol. Some transport layer data protocols may control the amount of information that may be transmitted during a time interval. The transmission control protocol (TCP) may be considered to be an example of one such protocol. TCP may limit the amount of information that is transmitted during a time interval based on a congestion window and slow start. At the beginning of transmission of an information flow, the congestion window may be set to an initial value. This may result in a relatively small amount of information being transmitted from a transmitting terminal to a receiving terminal. The receiving terminal may subsequently communicate an acknowledgement upon receipt of the information that was transmitted by the transmitting terminal.

Upon receipt of the acknowledgement, the transmitting terminal may increase the value associated with the congestion window to a number larger than the initial value, and transmit subsequent information based on the larger value that is associated with the congestion window. This may result in a larger amount of information being transmitted than during a comparable time interval in which the value associated with the congestion window is smaller. The size of the congestion window may increase with the increase in the value associated with the congestion window. A larger congestion window may also result in a higher information transfer rate between the transmitting terminal and the receiving terminal. The receiving terminal may communicate subsequent acknowledgements upon receipt of subsequent information. The transmitting terminal may continue to increase the size of the congestion window upon receipt of a subsequent acknowledgement.

In an instance in which the transmitting terminal does not receive a corresponding acknowledgement to previously transmitted information, the transmitting terminal may determine that the receiving terminal did not receive the previously transmitted information. The transmitting terminal may retransmit, or resend, previously transmitted information for which a corresponding acknowledgement was not received. In addition, the transmitting terminal may determine that congestion may exist in the network resulting in the previously transmitted information not being received by the receiving terminal. The previously transmitted information may be considered by the transmitting terminal to be "lost" in the network. In response to a determination of congestion in the network, or network congestion, the transmitting terminal may also reduce the size of the congestion window. The reduction in the size of the congestion window may result in a reduction in the information transfer rate between the transmitting terminal and the receiving terminal. Once reduced, the size of the congestion window may subsequently begin to increase once again. A maximum information transfer rate for a terminal may be determined by the speed of the NIC, which may represent the maximum rate at which the NIC may transmit or receive information via a communications media to a network.

As NIC speeds increase, the processing demands required to receive and transmit information at those speeds may also increase. For example, when a frame is received at receiving terminal, the NIC card in the receiving terminal may send a notification to the central processing unit (CPU) in the receiving terminal. The CPU may perform protocol related processing tasks related to the processing of received or transmitted packets. As the NIC speed increases, the number of such notifications, or interrupts, in a time interval may also increase. The volume of such interrupts may increase to the extent that the CPU is not able to perform other tasks. A user of the receiving terminal may observe degraded performance in applications, and/or in response to user input.

A TCP offload engine, or TOE, may comprise a technology for a TCP/IP (Internet Protocol) optimized NIC that processes TCP packets. This may result in an offload of these tasks from the CPU. An example of an application of the TOE may be in 10 Gigabit Ethernet NICs. 10 Gigabit Ethernet may comprise a standard that is specified in IEEE 802.3ae, and may define an information transfer rate of 10 gigabits per second. This rate may also be referred to as the "line rate". In some applications, 10 Gigabit Ethernet may be utilized to provide high speed interconnection between terminals, such as personal computers and computer workstations, and computer storage devices, such as disk drives, based on the Internet small computer systems interface (iSCSI). In addition, iSCSI may be utilized to provide high speed interconnect between various devices in a network comprising end stations, such as personal computers and computer workstations, and server devices, such as world wide web (WWW) servers, email servers, and streaming media servers. In some of these applications, information may be transmitted between, for example, a computer storage device, and a computer workstation, for a time duration that is long in comparison to a typical duration of an information transfer over the network. These long time duration information transfers may be referred to as "long lived" information flows, or long lived flows.

A plurality of devices that are connected to a network may transmit information. The aggregate quantity of traffic generated by the plurality of devices may exceed the capacity of the network for transporting information between a transmitting terminal or end station and a receiving terminal or end station. A portion of the quantity of traffic generated may be discarded by a device within the network. Packets that comprise information that is discarded may be regarded as lost packets. As interface speeds at NICs increase, the likelihood of congestion in the network may also increase. In addition, as the number of long lived flows increases, the likelihood of network congestion may also increase.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for TCP traffic smoothing, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for TCP traffic smoothing. Traffic smoothing may comprise a method for controlling data transmission in a communications system that further comprises scheduling the timing of transmission of information from a TCP offload engine (TOE) based on a traffic profile. Traffic smoothing may comprise transmitting information from a TOE at a rate that is either greater than, approximately equal to, or less than, the rate at which the information was generated. Some conventional network interface cards (NIC) that utilize TOEs may not provide a mechanism that enables traffic shaping. By not providing a mechanism for traffic shaping, there may be a greater probability of lost packets in the network.

Figure 1A:
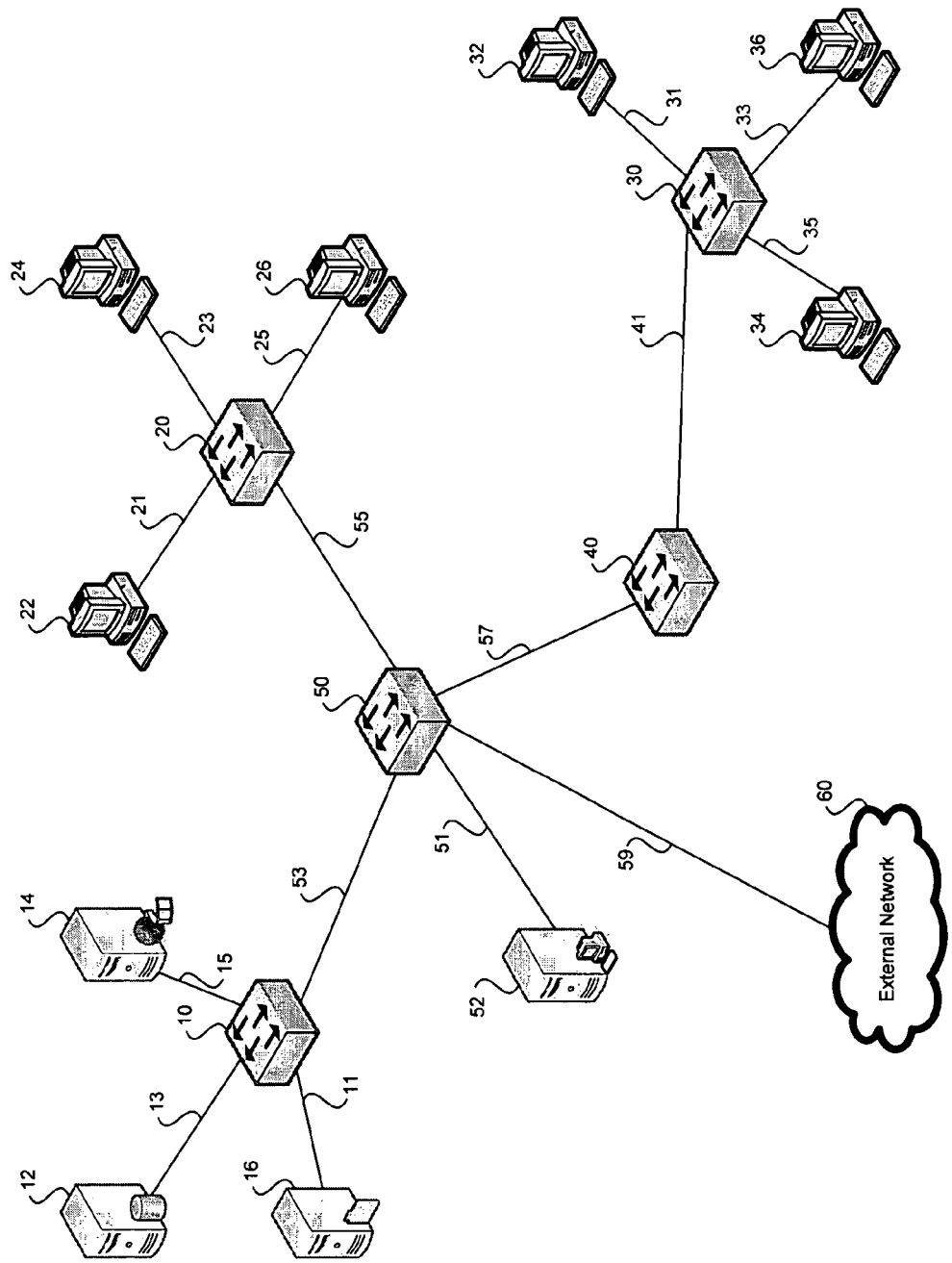
FIG. 1a is a diagram of an exemplary network and end stations that may be utilized in accordance with an embodiment of the invention.

FIG. 1a is a diagram of an exemplary network and end stations that may be utilized in accordance with an embodiment of the invention. Referring to FIG. 1a there is shown a network comprising a plurality of Ethernet switches 10, 20, 30, 40, and 50, an external network 60, and a plurality of end stations comprising computer workstations and servers. In FIG. 1a, there is shown a plurality of computer workstations 22, 24, 26, 32, 34, and 36, in addition to a plurality of servers, comprising a database server 12, a streaming media server 14, a file server 16, and a network management server 52. Also shown is a plurality of end station to network interfaces, 11, 13, 15, 21, 23, 25, 31, 33, 35, and 50, and a plurality of network device to network device interfaces 41, 51, 53, 55, 57, and 59.

The computer workstations 22, 24, 26, 32, 34, and 36 may comprise end stations that may be utilized by a user to execute programs and applications, for example, email, World Wide Web (WWW) browsers, database access programs, and media players. Computer workstation 22 may comprise a NIC that is coupled to interface 21. Computer workstation 22 may utilize a TOE to transmit information to, or receive information from, the network, via interface 21. Similarly, computer workstations 24, 26, 32, 34, and 36 may utilize interfaces 23, 25, 31, 33, and 35 respectively.

The database server 12 may store information in one or more databases. Database server 12 may comprise a NIC that is coupled to interface 13. One or more records comprising information may be retrieved from a database and subsequently transmitted to the network via interface 13. One or more records may be received from the network, via interface 13, and stored in a database.

The streaming media server 14 may store one or more video, audio, or multimedia programs. Streaming media server 14 may comprise a NIC that is coupled to interface 15. At least a portion of a program may be retrieved from secondary storage, and/or buffered in primary storage, and transmitted to the network via interface 15. The time duration of the transmission via the network may be greater than, approximately equal to, or less than the time duration of the program. A program may be received from the network, via interface 15, and stored.

The file server 16 may store information in one or more files. File server 16 may comprise a NIC that is coupled to interface 11. Files may be retrieved and subsequently transmitted to the network via interface 11. One or more files may be received from the network via interface 11, and stored.

The network management server 52 may store information pertaining to the configuration and/or availability of various network communication devices and/or interfaces within the network. The network management server 52 may also store information pertaining to the configuration and/or availability of end stations and interfaces connected to those end stations. Network management server 52 may comprise a NIC that is coupled to interface 51. The network management server 52 may be utilized to set configuration parameters that control the performance and/or behavior of network communication devices, interfaces, and/or end stations. The server 52 may utilize manage a network by utilizing a protocol such as the simple network management protocol (SNMP). The server 52 may transmit information comprising commands to set configuration parameters, or information comprising a report of current values of configuration parameters to the network via interface 51. The server 52 may also receive information comprising requests for configuration parameters from the network via interface 51.

The Ethernet switches 10, 20, 30, 40, and 50 may comprise exemplary network communications devices that may be utilized to facilitate the transfer of information between end stations that are coupled to the network. The switch 10 may comprise one or more line cards that are coupled to interfaces 11,13, 15, and 53. The switch 10 may communicate with server 12 via interface 13, with server 14 via interface 10, with server 16 via interface 11, and with switch 50 via interface 53. The switch 10 may facilitate the transfer of information from any of the group comprising end stations 12, 14, and 16, and the switch 50, to any other end station or switch among this group.

The switch 20 may comprise one or more line cards that are coupled to interfaces 21, 23, 25, and 55. The switch 20 may communicate with workstation 22 via interface 21, with workstation 24 via interface 23, with workstation 26 via interface 25, and with switch 50 via interface 55. The switch 20 may facilitate the transfer of information from any of the group comprising end stations 22, 24, and 26, and the switch 50, to any other end station or switch among this group.

The switch 30 may comprise one or more line cards that are coupled to interfaces 31, 33, 35, and 41. The switch 30 may communicate with workstation 32 via interface 31, with workstation 34 via interface 35, with workstation 36 via interface 33, and with switch 40 via interface 41. The switch 30 may facilitate the transfer of information from any of the group comprising end stations 32, 34, and 36, and the switch 40, to any other end station or switch among this group.

The switch 30 may comprise one or more line cards that are coupled to interfaces 31, 33, 35, and 41. The switch 30 may communicate with workstation 32 via interface 31, with workstation 34 via interface 35, with workstation 36 via interface 33, and with switch 40 via interface 41. The switch 30 may facilitate the transfer of information from any of the group comprising end stations 32, 34, and 36, and the switch 40, to any other end station or switch among this group.

The switch 40 may comprise one or more line cards that are coupled to interfaces 41, and 57. The switch 40 may communicate with switch 30 via interface 41, and with switch 50 via interface 57. The switch 30 may facilitate the transfer of information from either of the group comprising switches 30 and 50, to either other switch among this group.

The switch 50 may comprise one or more line cards that are coupled to interfaces 51, 53, 55, 57 and 59. The switch 50 may communicate with server 52 via interface 51, with switch 10 via interface 53, with switch 20 via interface 55, with switch 40 via interface 57, and with the external network 60 via interface 59. The switch 50 may facilitate the transfer of information from any of the group comprising end station 52, switches 10, 20, 40, external network 60 to any other end station, switch, or external network among this group.

The external network 60 may comprise one or more networks that may be coupled, directly or indirectly, to interface 59. One or more end stations may be coupled to the external network 60.

In operation, the network shown in FIG. 1*a* may comprise a communications system that enables a transmission of information between end stations that are coupled to the network. The network may also enable the end stations to transmit information to, or receive information from, an external network 60. Network congestion may occur that may result in packets being lost. For example, the plurality of servers 12, 14, and 16, and the plurality of workstations 22, 24, 26, 32, 34, and 36 may transmit information to the external network 60 during approximately overlapping time intervals. If the aggregate line rate of interfaces 11, 13, and 15 is greater than the line rate of interface 53, network congestion may occur at switch 10. If the aggregate line rate of interfaces 21, 23, and 25 is greater than the line rate of interface 55, network congestion may occur at switch 20. If the aggregate line rate of interfaces 31, 33, and 35 is greater than the line rate of interface 41, network congestion may occur at switch 30. If the aggregate line rate of interfaces 53, 55, and 57 is greater than the line rate of interface 59, network congestion may occur at switch 50.

Figure 1B:
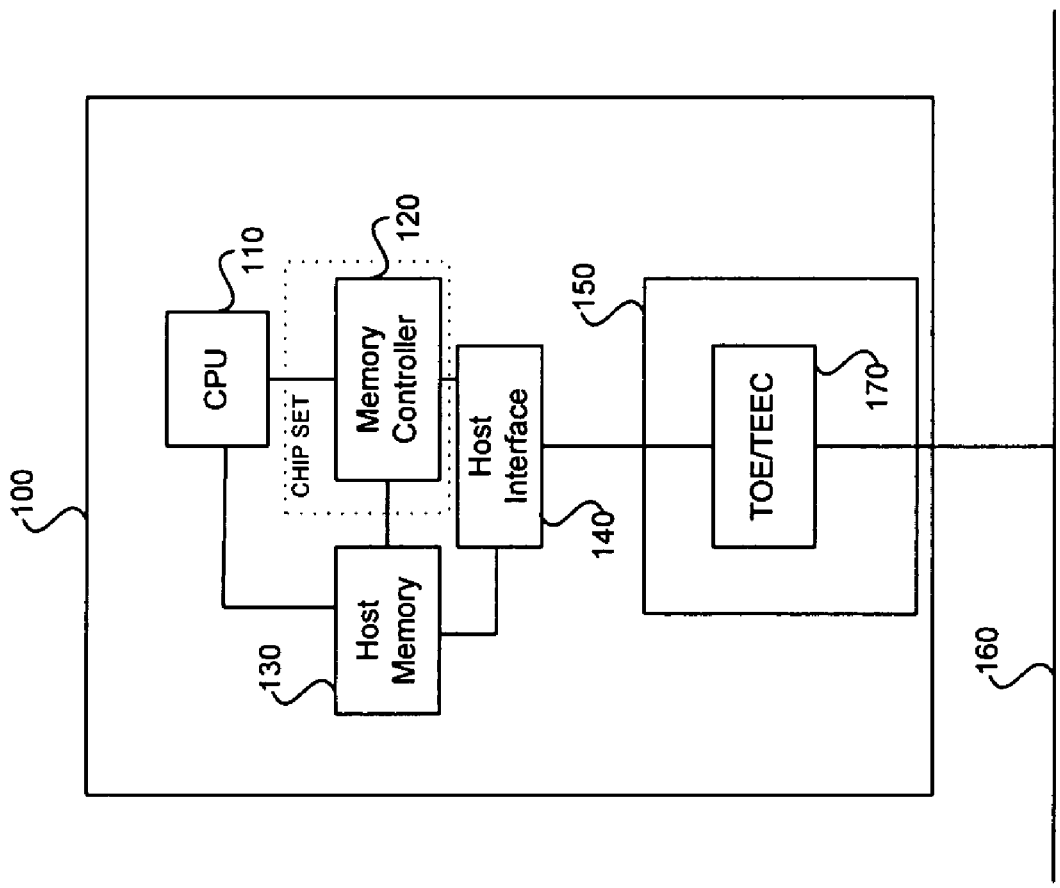
FIG. 1b is a block diagram of an exemplary end station that may be utilized for transmission control protocol (TCP) traffic smoothing, in accordance with an embodiment of the invention.

FIG. 1*b* is a block diagram of an exemplary end station that may be utilized for transmission control protocol (TCP) traffic smoothing, in accordance with an embodiment of the invention. Referring to FIG. 1*b* there is shown an end system 100, and a network interface 160. The end system 100 may comprise a central processing unit (CPU) 110, a memory controller 120, a host memory 130, a host interface 140, and a NIC 150. The NIC 150 may comprise a TOE or a TCP-enabled Ethernet controller (TEEC) 170.

The CPU 110 may be coupled to the memory controller 120, and to host memory 130. The CPU 110 may comprise suitable logic, circuitry, and/or code to communicate commands and/or information packets to the memory controller 120 or to host memory 130. The host memory 130 may be coupled to the CPU 110, the memory controller 120, and the host interface 140. The host memory 130 may comprise suitable logic, circuitry, and/or code to be utilized to store, or write, and retrieve, or read, information. It may comprise a plurality of memory technologies such as random access memory (RAM). The memory controller 120 may be coupled to the CPU 110, the host memory 130, and to the host interface 140. The memory controller 120 may comprise suitable logic, circuitry, and/or code to communicate commands to the host memory 130 to control writes to and/or reads from host memory 130. The effect of control of reads from host memory may schedule the timing of reads from and/or writes to host memory 130. The memory controller 130 may be a component in a chip set that comprises a plurality of integrated circuit devices. The host interface 140 may be coupled to the memory controller 120, to the host memory 130, and to the NIC 150. The host interface 140 may comprise suitable logic, circuitry, and/or code to be utilized to communicate information being read, from host memory 130, to the NIC 150. The host interface 140 may also be utilized to communicate information being received, from the NIC 150, to the host memory 130 where the information may be written. The NIC 150 may be coupled to the host interface 140 and to the network interface 160. The NIC 150 may comprise suitable logic, circuitry, and/or code to be utilized to transmit information from the host interface 140 to a network via the interface 160. The NIC 150 may be utilized to receive information from the network via the interface 160, and to communicate the received information to the host interface 140. The TOE 170 may comprise suitable logic, circuitry, and/or code to perform protocol processing and to construct one or more packets and/or one or more frames that may be utilized to transmit information to the network via the interface 140.

In operation, the CPU 110 may execute steps in an application program that utilizes the TOE 170 in the NIC 150 to transmit information to a network via the interface 160. The CPU 110 may communicate instructions that cause a computer storage device, such as a disk drive, to transfer data to the host memory 130. The CPU 110 may subsequently communicate instructions to the memory controller 120 that causes host memory 130 to transfer the data to the host interface 140. The host interface 140 may communicate the data to the NIC 150. The TOE 170 within the NIC may perform protocol processing on the data to construct one or more packets and/or one or more frames that may be utilized to transmit the data across the network to a receiving terminal. The memory controller 120 may schedule the timing of reading of data from host memory 130 such that the memory controller may also schedule the timing of transmission of packets comprising the data from the TCP offload engine to the network. The memory controller 120 may utilize a traffic profile to determine a schedule. For example, a traffic profile may specify a rate at which information is to be transmitted from the TOE to the network. That rate may be greater than, approximately equal to, or less than a rate at which information is transferred from the CPU 110 to the host memory 130. The rate may also be greater than, approximately equal to, or less than a rate at which information is transferred from a computer storage device to the host memory 130. The rate at which information is transferred to the host memory 130 for subsequent transmission to the network via an interface 160, may be referred to as the rate at which information was generated.

Figure 1C:
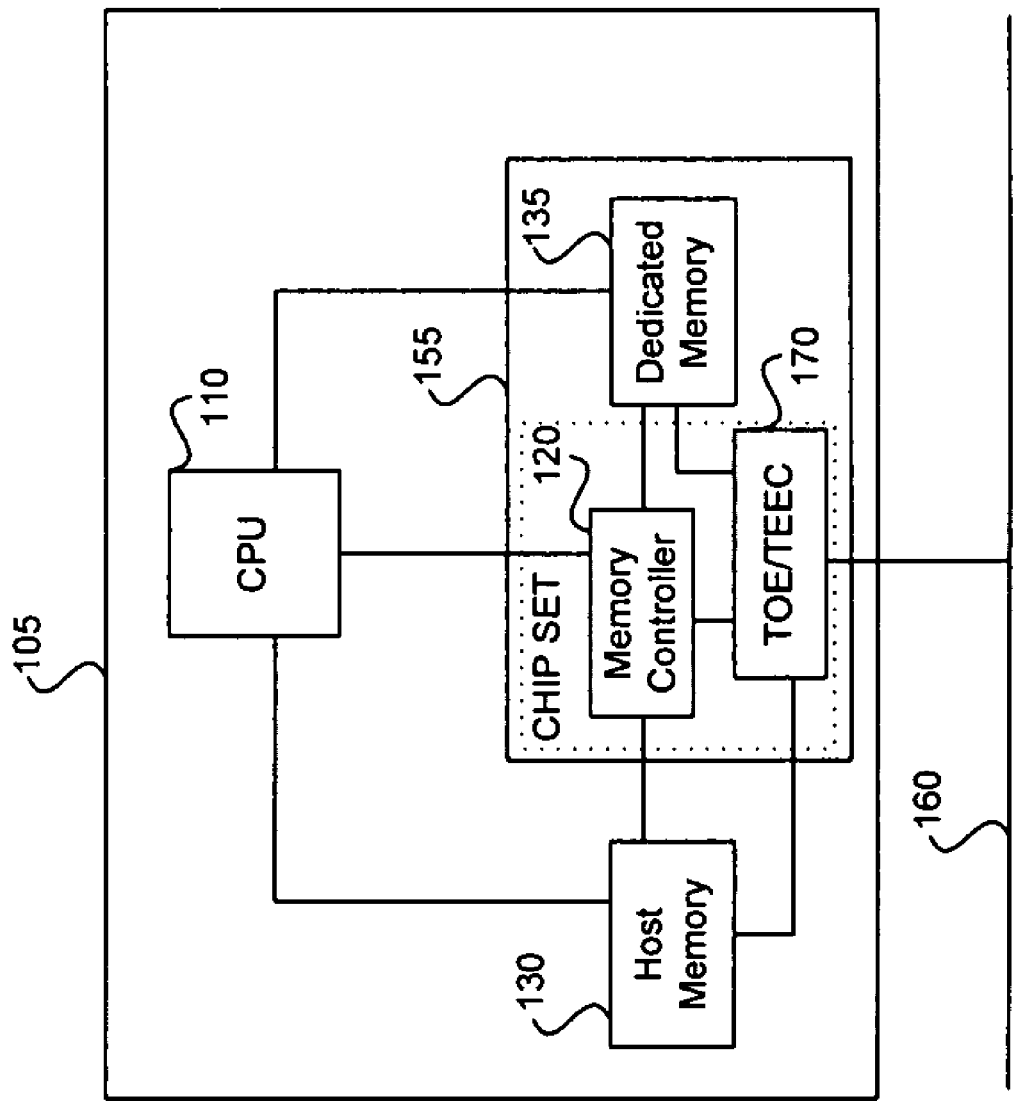
FIG. 1c is a block diagram of an exemplary end station comprising a network interface card that may be utilized for transmission control protocol (TCP) traffic smoothing, in accordance with an embodiment of the invention.

FIG. 1c is a block diagram of an exemplary end station comprising a network interface card that may be utilized for transmission control protocol (TCP) traffic smoothing, in accordance with an embodiment of the invention. Referring to FIG. 1c there is shown an end system 105, and a network interface 160. The end system 105 may comprise a central processing unit (CPU) 110, a host memory 130, and a NIC 155. The NIC 155 may comprise a memory controller 120, a dedicated memory 135, and a TOE or a TEEC 170.

In comparison to FIG. 1b, the memory controller 120 may be resident on the NIC in the exemplary end system illustrated in FIG. 1c. This may enable at least a portion of traffic shaping to be performed by the NIC 155. The CPU 110, memory controller 120, host memory 130, and TOE 170 may be as described in connection with FIG. 1b. The memory controller 120 may be coupled to the TOE 170 in FIG. 1c. The dedicated memory 135 may comprise suitable logic, circuitry, and/or code to be utilized to store, or write, and retrieve, or read, information. In operation the memory controller 120 and/or TOE 170 may utilize the dedicated memory 135 to perform tasks related to traffic smoothing.

Figure 2A:
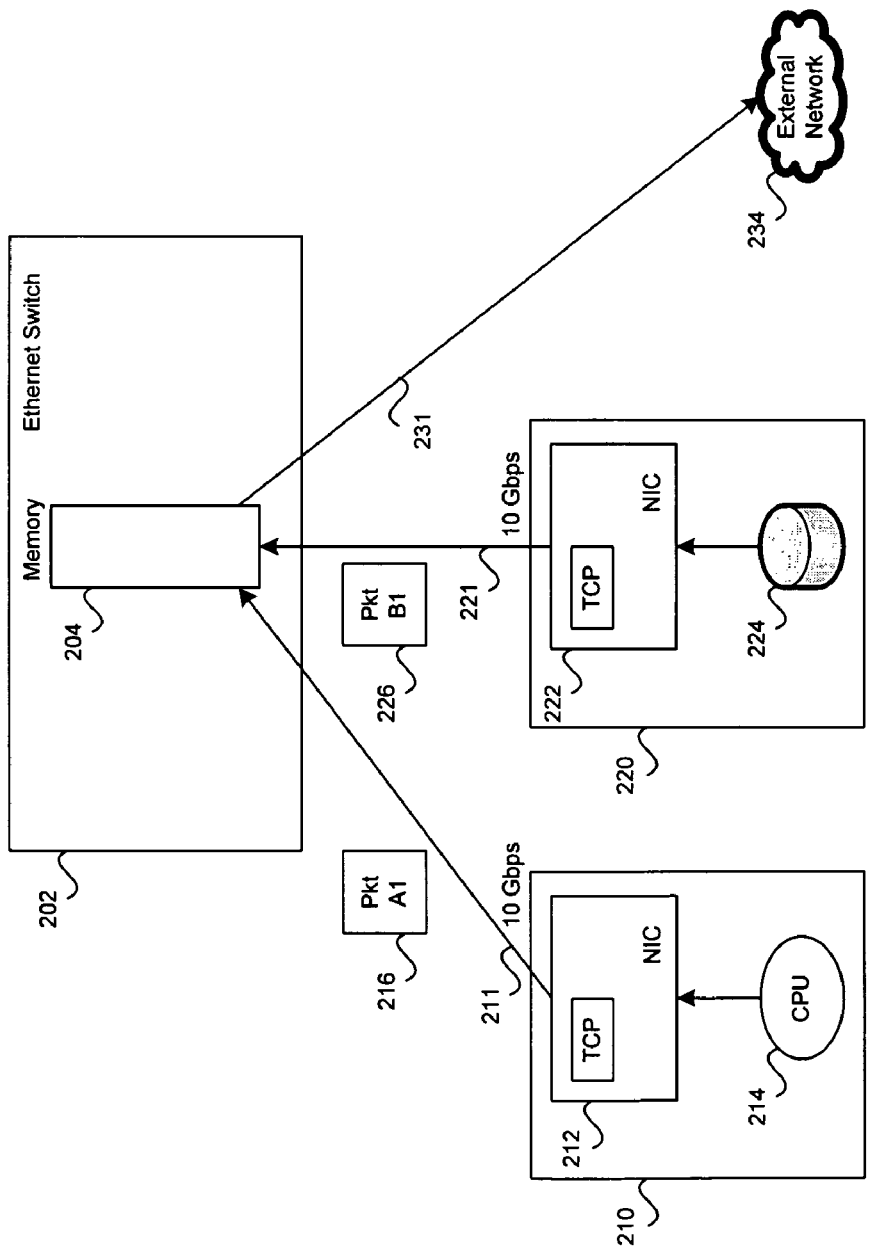
FIG. 2a illustrates an exemplary packet transmission via a TCP network that may be utilized in connection with an embodiment of the invention.

FIG. 2a illustrates an exemplary packet transmission via a TCP network that may be utilized in connection with an embodiment of the invention. Referring to FIG. 2a there is shown an Ethernet switch 202, a plurality of end stations 210, and 220, a plurality of interfaces 211, 221, 231, a plurality of packets 216, 226, and an external network 234. The Ethernet switch 202 may comprise memory 204. The end station 210 may comprise a NIC 212, and a CPU 214. The end station 220 may comprise a NIC 222, and a disk drive 224.

The NIC 212 may utilize a protocol, such as TCP, to transmit packet 216 via interface 211. The NIC 222 may utilize a protocol, such as TCP, to transmit packet 226 via interface 221. The packet 216 may comprise information that is generated by CPU 214. The packet 226 may comprise information that is generated by disk drive 224. The NIC 212 may be coupled to interface 211. The NIC 222 may be coupled to interface 221. The Ethernet switch 202 may be coupled to interfaces 211, 221, and 231.

In operation, the end station 210 may transmit a packet 216 to a receiving end station attached to the external network 234. The Ethernet switch 202 may receive the packet 216 via interface 221. The Ethernet switch 202 may subsequently transmit the packet 216, via interface 231, to the external network 234. Similarly, the end station 220 may transmit a packet 226 to a receiving end station attached to the external network 234 via Ethernet switch 202. The interfaces 211, and 221, and 231 may be characterized by a line rate of approximately 10 gb/s. The packet 216 may comprise a plurality of binary bits that may be transmitted via interface 211 at a rate of 10 gb/s. The packet 216 may comprise a plurality of binary bits that may be transmitted via interface 221 at a rate of 10 gb/s. The packet 216 may be transmitted from the end station 210 to the Ethernet switch 202. The received packet 216 may be stored in memory 204 at the Ethernet switch 202 prior to being forwarded to the external network 234 via interface 231. The packet 226 may be transmitted from the end station 220 to the Ethernet switch 202. The received packet 226 may be stored in memory 204 at the Ethernet switch 202 prior to being forwarded to the external network 234 via interface 231.

Figure 2B:
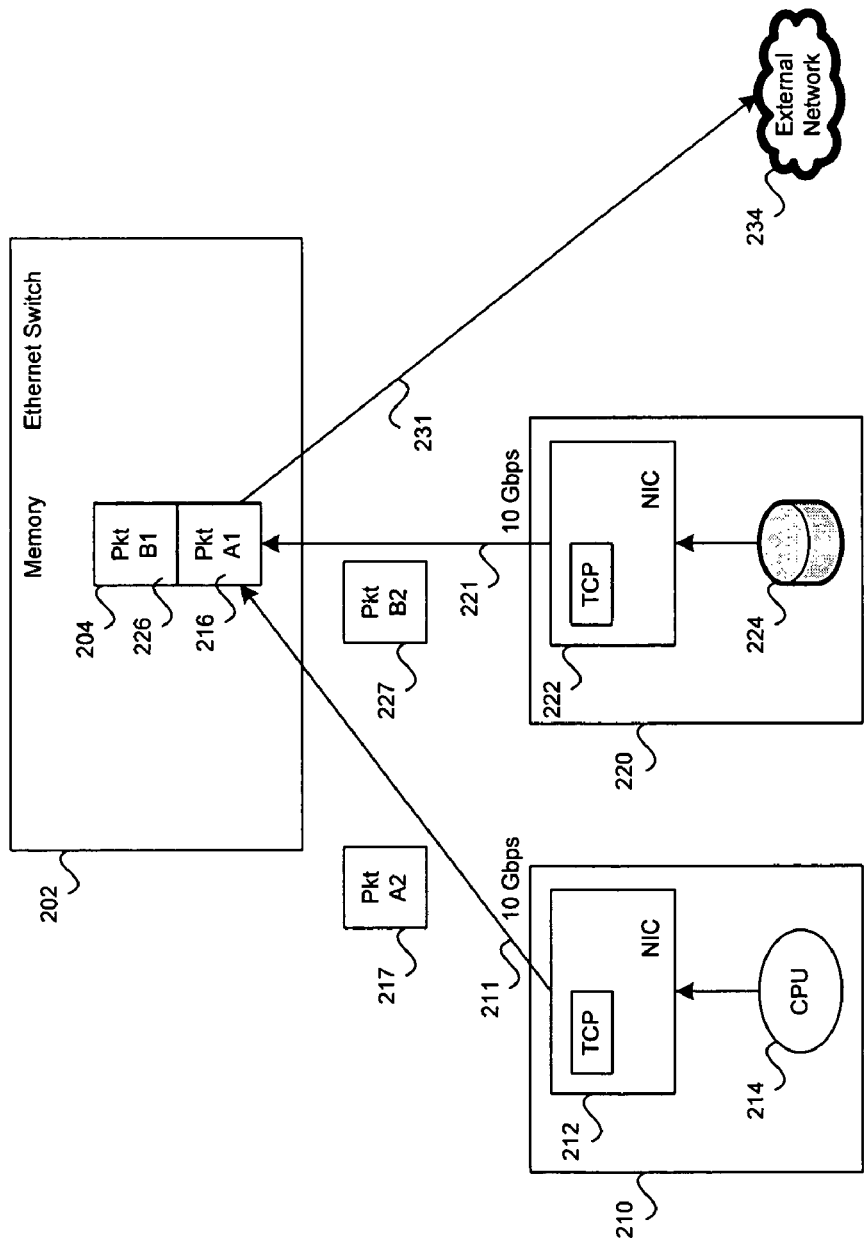
FIG. 2b illustrates an exemplary subsequent packet transmission via a TCP network that may be utilized in connection with an embodiment of the invention.

FIG. 2b illustrates an exemplary subsequent packet transmission via a TCP network that may be utilized in connection with an embodiment of the invention. Referring to FIG. 2b there is shown an Ethernet switch 202, a plurality of end stations 210, and 220, a plurality of interfaces 211, 221, 231, a plurality of packets 216, 217, 226, 227 and an external network 234. The Ethernet switch 202 may comprise memory 204. The end station 210 may comprise a NIC 212, and a CPU 214. The end station 220 may comprise a NIC 222, and a disk drive 224.

In comparison to FIG. 2a, FIG. 2b may illustrate packet transmission at a subsequent time instant. In FIG. 2b, the packets 216 and 226 may have been received by the Ethernet switch 202, and stored in memory 204. The packets 216 and 226 may utilize the full storage capacity of the memory 204. The NIC 212 may not utilize traffic smoothing. After transmitting packet 216, end station 210 may continue to transmit information at a 10 gb/s rate, subsequently transmitting packet 217 via interface 211. The NIC 222 may not utilize traffic smoothing. After transmitting packet 226, end station 220 may continue to transmit information at a 10 gb/s rate, subsequently transmitting packet 227 via interface 221.

Figure 2C:
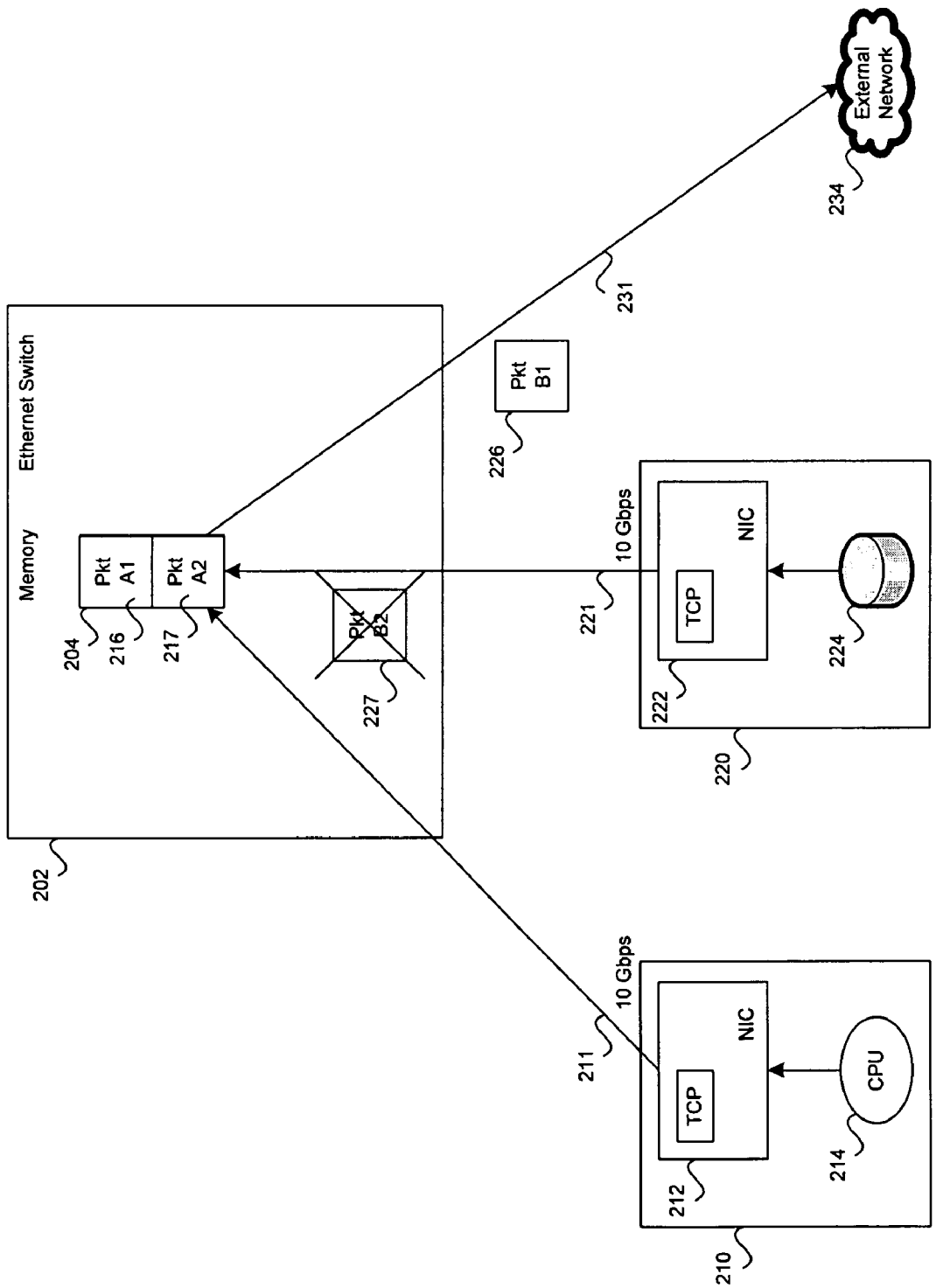
FIG. 2c illustrates an exemplary packet discard in a TCP network that may be utilized in connection with an embodiment of the invention.

FIG. 2c illustrates an exemplary packet discard in a TCP network that may be utilized in connection with an embodiment of the invention. Referring to FIG. 2c there is shown an Ethernet switch 202, a plurality of end stations 210, and 220, a plurality of interfaces 211, 221, 231, a plurality of packets 216, 217, 226, 227 and an external network 234. The Ethernet switch 202 may comprise memory 204. The end station 210 may comprise a NIC 212, and a CPU 214. The end station 220 may comprise a NIC 222, and a disk drive 224.

In comparison to FIG. 2b, FIG. 2c may illustrate packet transmission and discard. Traffic received by the Ethernet switch 202 via interfaces 211 and 221 may be transmitted via interface 231. The aggregate line rate of the interfaces 211 and 221 may equal approximately 20 gb/s. This aggregate line rate may be greater than the approximately 10 gb/s line rate of the interface 231. As a result, packets may arrive at the Ethernet switch 202, and be stored in memory 204, at a rate that is greater than the rate at which packets may be transmitted by the Ethernet switch 202, and retrieved from memory 204. FIG. 2c may illustrate that the packet 226 has been retrieved from memory 204 and transmitted via interface 231. The retrieval of packet 226 from memory 204 may free space in memory for a subsequent packet. Packet 217 may be stored in memory 204. The memory 204 may not comprise free space to receive a subsequent packet 227. Consequently, the Ethernet switch 202 may discard packet 227.

Figure 3A:
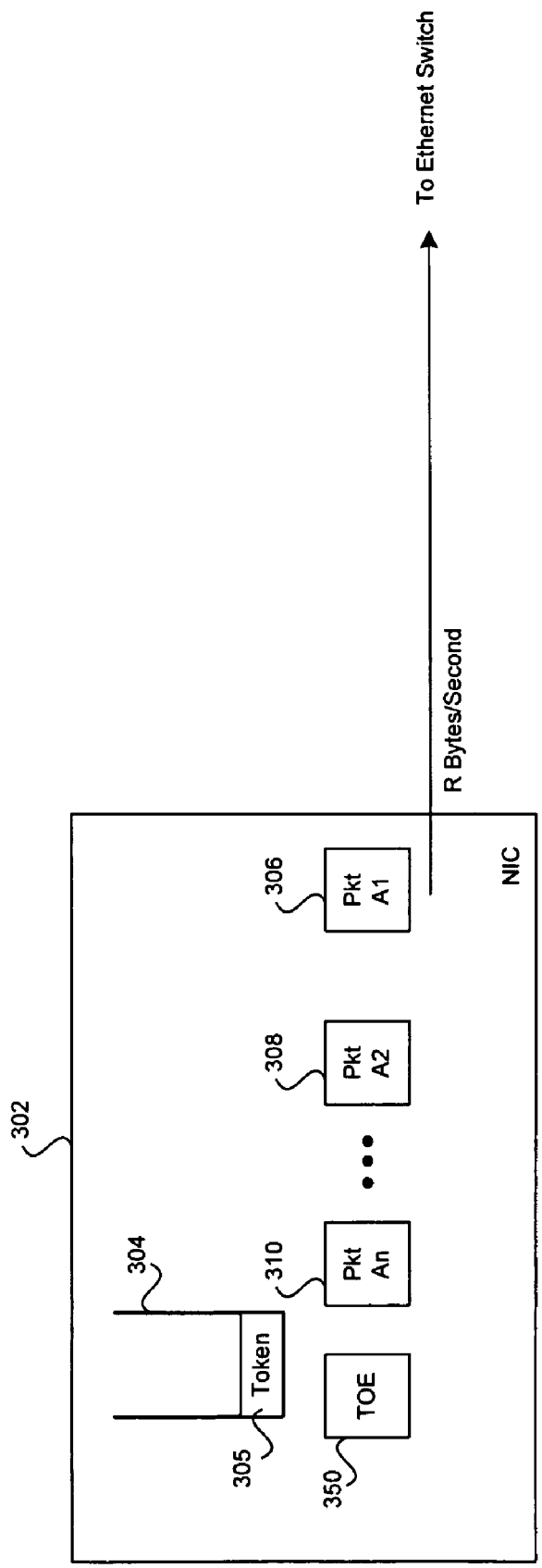
FIG. 3a illustrates information transmission that is compliant with a traffic profile in an exemplary NIC that may be utilized for TCP traffic smoothing, in accordance with an embodiment of the invention.

FIG. 3a illustrates information transmission that is compliant with a traffic profile in an exemplary NIC that may be utilized for TCP traffic smoothing, in accordance with an embodiment of the invention. Referring to FIG. 3a there is shown a NIC 302. The NIC 302 may comprise a token bucket 304, a token 305, a TOE 350, and a plurality of packets 306, 308, . . . ,310. The packets 306, 308, . . . ,310 may be generated by the TOE 350.

The NIC 302 may utilize a traffic profile that specifies a rate of transmission of information that is approximately equal to R bytes/second. The rate of R bytes/second may be less than the line rate for the NIC 302. As long as the rate at which traffic was generated is approximately equal to R bytes/second, the traffic smoothing may comprise scheduling the transmitting information in packets 306, 308, . . . ,310 from the TOE 350 at a rate that is approximately equal to the rate at which the information was generated. At a given time instant, the state of the token bucket 304 may comprise a token 305. Tokens may arrive in the token bucket 304 at a rate, for example a rate of R. With each arrival a corresponding token count associated with the token bucket 304 may increase. The token count may increase to a maximum value, $T_{max}$. The token bucket 304 may be considered to be in a full state, or full, when the current token count value is $T_{max}$. Subsequent to the transmission of the packet 306 by the TOE 350, the number of tokens contained in the token bucket 304 may decrease. This decrease may change a corresponding token count associated with the token bucket 304. If a current value of the token count is less than or equal to 0, the traffic shaping algorithm may inhibit the NIC 302 from transmitting a subsequent packet 308 until the token count achieves a value greater than 0. The token bucket 304 may be considered to be in an empty state, or empty, when the current token count is less than or equal to 0. If the rate at which information is generated is approximately equal to R bytes/second, then the token count associated with the token bucket 304 may be greater than 0 at time instants when packets 306, 308, and 310 are transmitted by the TOE 350.

Figure 3B:
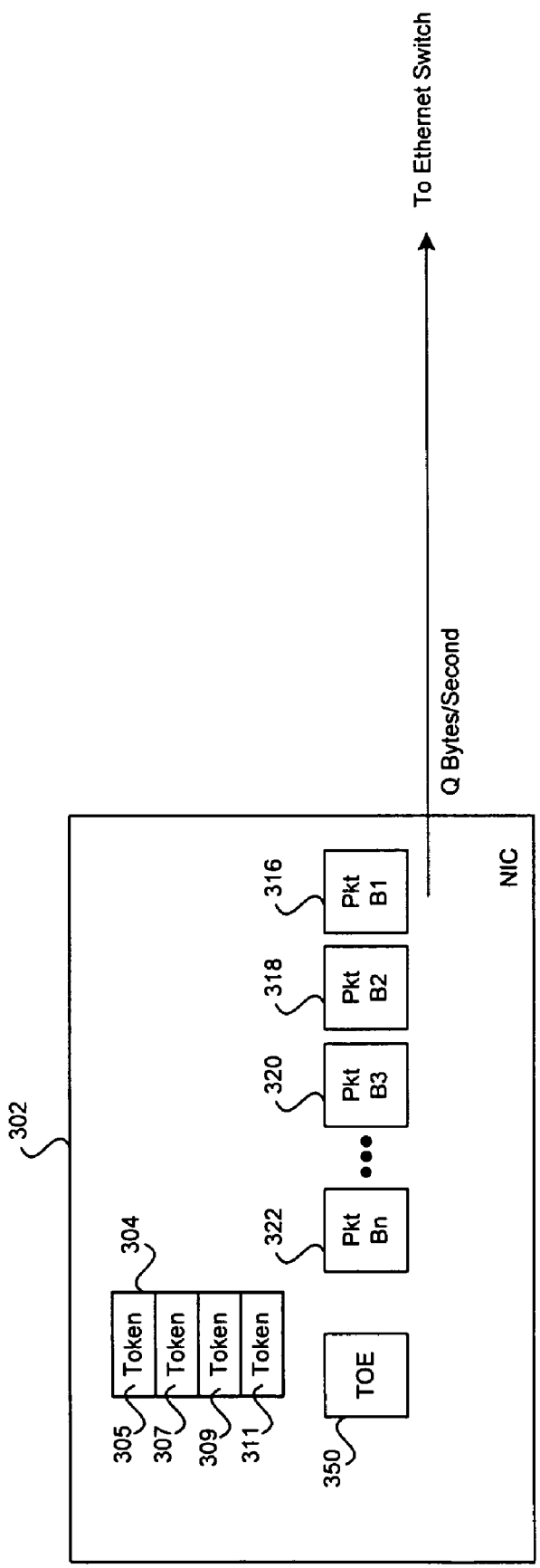
FIG. 3b illustrates information transmission that is non-compliant with a traffic profile, and with token bucket fill in an exemplary NIC that may be utilized for TCP traffic smoothing, in accordance with an embodiment of the invention.

FIG. 3b illustrates information transmission that is non-compliant with a traffic profile, and with token bucket fill in an exemplary NIC that may be utilized for TCP traffic smoothing, in accordance with an embodiment of the invention. Referring to FIG. 3b there is shown a NIC 302. The NIC 302 may comprise a token bucket 304, a plurality of tokens 305, 307, 309, and 311, a TOE 350, and a plurality of packets 316, 318, 320, . . . ,322. The packets 316, 318, 320, . . . ,322 may be generated by the TOE 350.

The NIC 302 may utilize a traffic profile that specifies a rate of transmission of information that is approximately equal to R bytes/second. The rate of R bytes/second may be less than the line rate for the NIC 302. If the rate at which traffic was generated is approximately equal to Q bytes/second, where the rate Q is greater than the rate R, the traffic smoothing may comprise scheduling the transmitting information in packets 316, 318, 320, . . . ,322 from the TOE 350 at a rate that is approximately equal to the rate at which the information was generated for a limited period of time. That period of time may be determined based on the state of the token bucket 304. If packets are transmitted at the rate Q>R for a time increment, the token count may be reduced at a rate that exceeds the rate at which tokens may be replenished. At the start of transmission at the rate Q>R, the token count associated with the token bucket 304 may have achieved a value of $T_{max}$. This may indicate that the token bucket 304 is full and can accept no more token arrivals. The time interval during which information may be transmitted at a rate Q>R, $t_{burst}$, may be less than or equal to $T_{max}/(Q-R)$, for example.

Figure 3C:
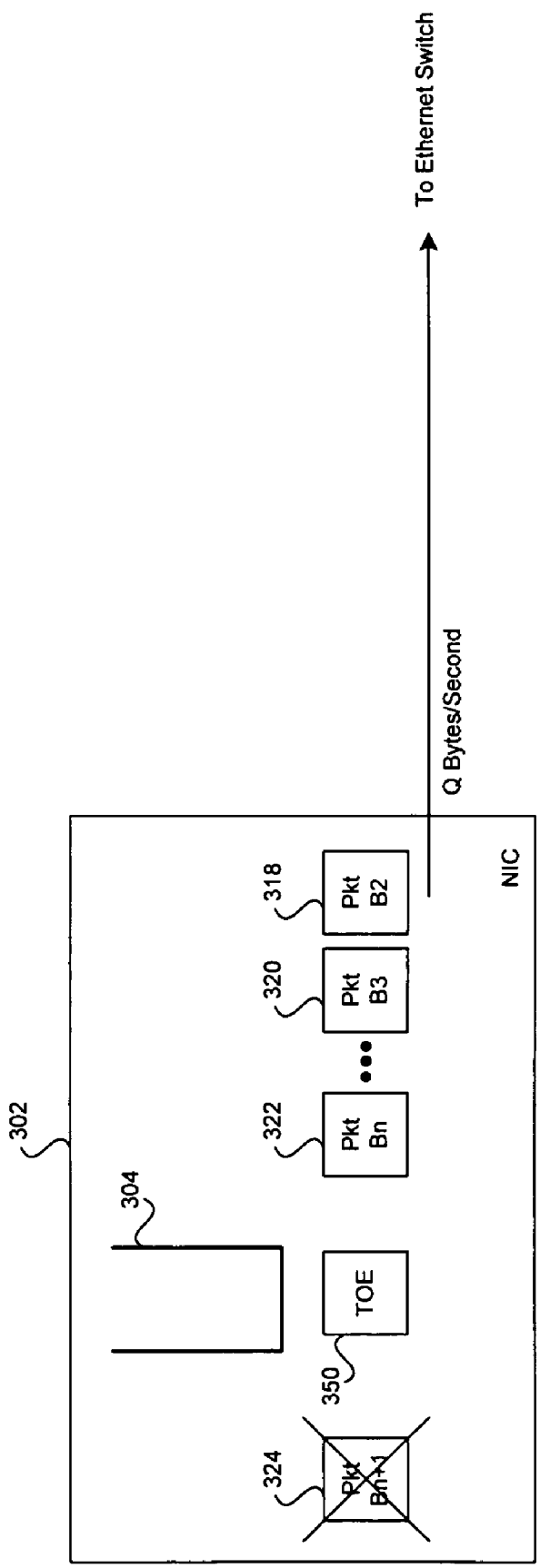
FIG. 3c illustrates information transmission that is non-compliant with a traffic profile, and with a full token bucket in an exemplary NIC that may be utilized for TCP traffic smoothing, in accordance with an embodiment of the invention.

FIG. 3c illustrates information transmission that is non-compliant with a traffic profile, and with a full token bucket in an exemplary NIC that may be utilized for TCP traffic smoothing, in accordance with an embodiment of the invention. Referring to FIG. 3c there is shown a NIC 302. The NIC 302 may comprise a token bucket 304, a TOE 350, and a plurality of packets 318, 320, . . . ,322, 324. The packets 318, 320, . . . ,322, 324 may be generated by the TOE 350.

Continuing from the discussion of FIG. 3b, if the token count associated with the token bucket 304 reaches a value that is less than or equal to 0 while the rate at which traffic is generated continues at a rate approximately equal to Q bytes/second, where the rate Q is greater than the rate R, the traffic smoothing may comprise scheduling the transmitting information in packets 318, 320, . . . ,322, 324 from the TOE 350 at a rate that is less than the rate at which the information was generated. When the token bucket 304 is in an empty state, traffic smoothing may no longer permit information to be transmitted by the TOE 350 at the rate of approximately Q bytes/second. In this case, information generated for inclusion in packet 324 may not be transmitted by the TOE 350 in accordance with the schedule in which the packet 324 was generated. As a result of traffic smoothing, the transmission of packet 324 may be blocked in FIG. 3c. The end system 105 that comprises the NIC 302 may be required to buffer the information in host memory 130 until it is allowed to be scheduled for transmission. The packet 324 may not be allowed to be scheduled for transmission by the TOE 350 until the token count associated with the token bucket 304 reaches a value greater than 0, and is no longer in an empty state.

Figure 3D:
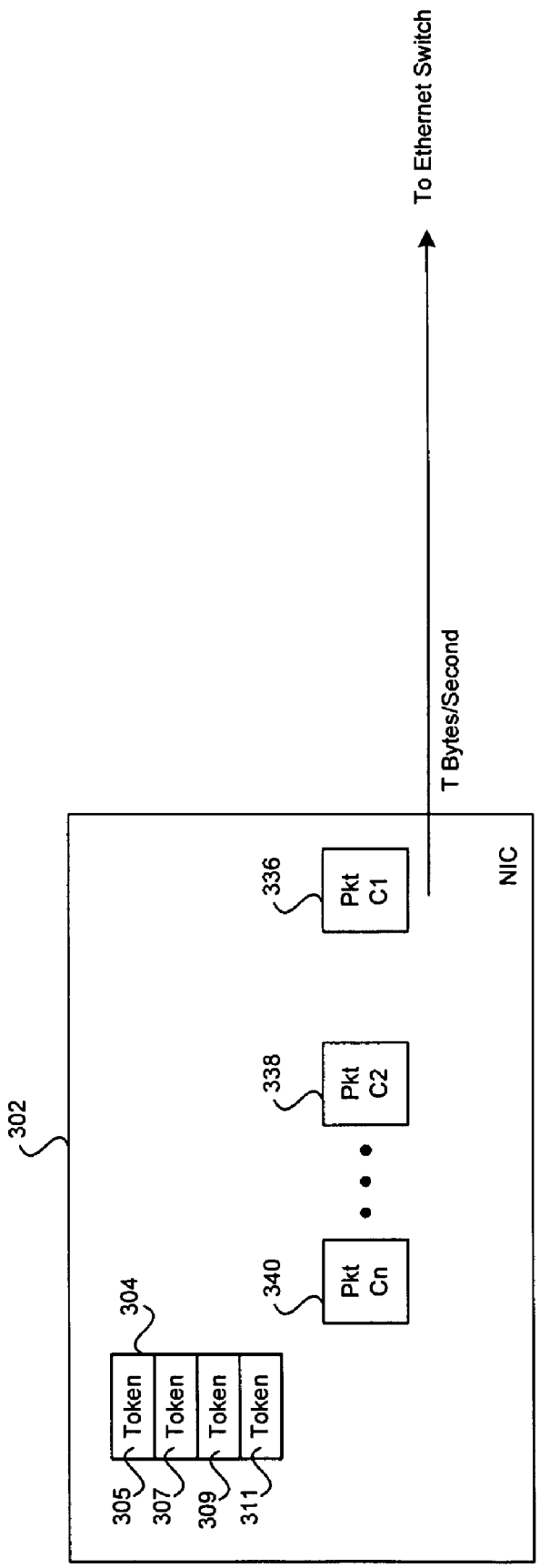
FIG. 3d illustrates information transmission that is compliant with a traffic profile, and with token bucket emptying in an exemplary NIC that may be utilized for TCP traffic smoothing, in accordance with an embodiment of the invention.

FIG. 3d illustrates information transmission that is compliant with a traffic profile, and with token bucket emptying in an exemplary NIC that may be utilized for TCP traffic smoothing, in accordance with an embodiment of the invention. Referring to FIG. 3d there is shown a NIC 302. The NIC 302 may comprise a token bucket 304, a plurality of tokens 305, 307, 309 and 311, and a plurality of packets 336, 338, . . . ,340. The packets 336, 338, . . . ,340 may be generated by the TOE 350.

Continuing from the discussion of FIG. 3c, if the rate at which traffic was generated is reduced to a rate of approximately T bytes/second, where the rate T is less than the rate R for a decrementing time increment, the rate at which tokens arrive in the token bucket 304 may be greater than the rate at which tokens are removed. As transmission continues at the rate T<R the token count associated with the token bucket 304 may increase. If at the start of a time interval, the token bucket 304 is empty, over a time interval during which the rate T<R, the state of the token bucket 304 may change as a result of the addition of a token 305. If transmission continues at this rate for a subsequent time interval, the state of the token bucket 304 may subsequently change due to the arrival of token 307. As transmission continues at this rate, the state of the token bucket 304 may change by the addition of token 309, and afterwards, token 311. With addition of tokens 305, 307, 309, and 311 to the token bucket 304, the associated token count may also increase. In various embodiments of the invention, the token count may increase until it reaches a maximum value, $T_{max}$. At that point, the token bucket 304 may be full and no further token arrivals may occur while the token bucket 304 remains in a full state.

Figure 4:
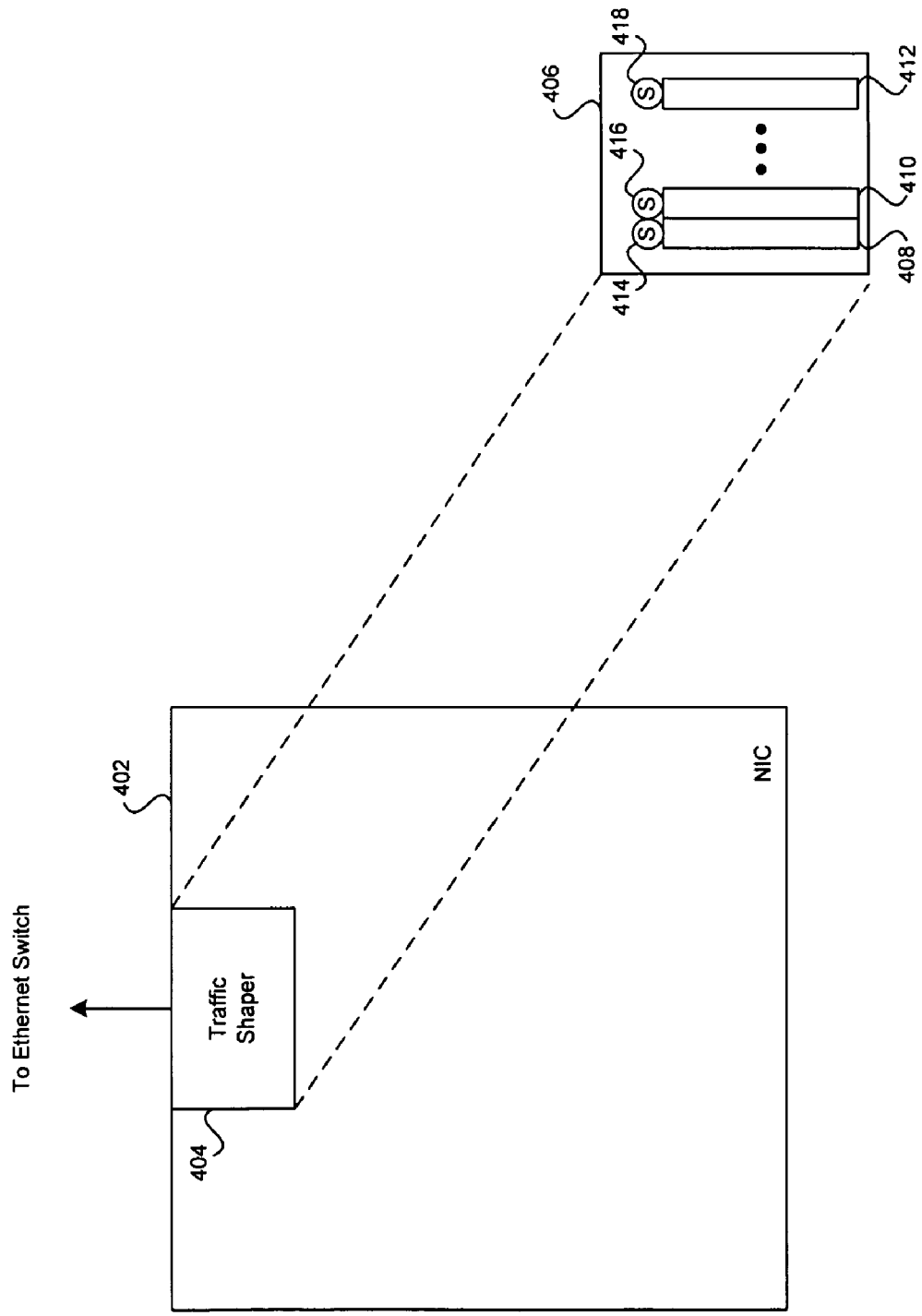
FIG. 4 is a block diagram of an exemplary system that may be utilized to perform traffic smoothing on a per information flow basis, in accordance with an embodiment of the invention.

FIG. 4 is a block diagram of an exemplary system that may be utilized to perform traffic smoothing on a per information flow basis, in accordance with an embodiment of the invention. Referring to FIG. 4 there is shown a NIC 402. The NIC 402 may comprise a traffic shaper 404. The traffic shaper may perform traffic shaping on at least a portion of the aggregate of information flows 406 that may be transmitted by the NIC 402. The aggregate of flows 406 may comprise a plurality of individual information flows 408, 410, . . . ,412, and a plurality of traffic shapers 414, 416, . . . ,418. The traffic shaper 414 may perform traffic shaping on the individual information flow 408. The traffic shaper 416 may perform traffic shaping on the individual information flow 410. The traffic shaper 418 may perform traffic shaping on the individual information flow 412.

An information flow may be uniquely identified based on information contained in header information contained in frames and/or packets that may be generated by the TOE or higher layer protocols. The information flow may, for example, be uniquely identified based on a protocol, a source address, a destination address, a source port, a destination port and/or header fields found in higher layer protocols. A protocol may identify a protocol being utilized to transmit a packet via a network. Examples of protocol may comprise TCP, or the user datagram protocol (UDP), or iSCSI, which operates above TCP. An example of source and/or destination address is an internet protocol (IP) address. A source and/or destination port may identify an application being utilized by the transmitting end station and receiving end station that are engaged in a communication. Examples of ports may represent the hypertext transfer protocol (HTTP), the file transfer protocol (FTP), or the simple mail transfer protocol (SMTP).

In various embodiments of the invention, a traffic shaper 414 may utilize a traffic profile to perform traffic shaping on information transmitted in association with an information flow 408. A subsequent traffic shaper 416 may utilize a traffic profile that is different from that of traffic shaper 414. Traffic shaper 416 may perform traffic shaping on information transmitted in associated with an information flow 410. For some information flows among the plurality of information flows 408, 410, . . . ,412, no traffic shaping may be performed.

Figure 5A:
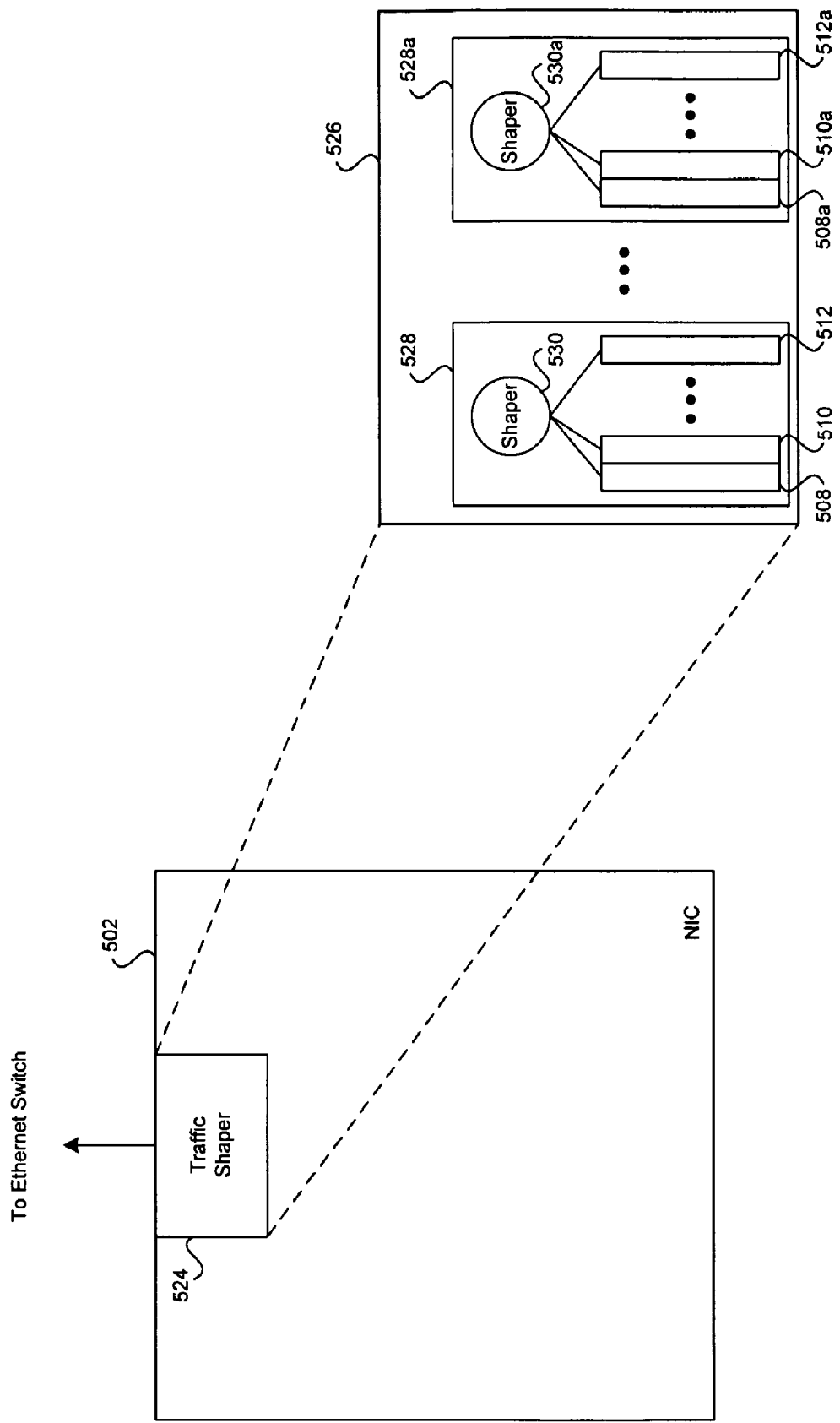
FIG. 5a is a block diagram of an exemplary system that may be utilized to perform traffic smoothing on a per class of service (COS) basis, in accordance with an embodiment of the invention.

FIG. 5a is a block diagram of an exemplary system that may be utilized to perform traffic smoothing on a per class of service (COS) basis, in accordance with an embodiment of the invention. Referring to FIG. 5a there is shown a NIC 502. The NIC 502 may comprise a traffic shaper 524. The traffic shaper may perform traffic shaping on at least a portion of the aggregate of information flows 526 that may be transmitted by the NIC 502. The aggregate of flows 526 may comprise a plurality of individual classes of service 528, . . . ,528a. The class of service 528 may comprise a plurality of individual information flows 508, 510, . . . ,512, and a traffic shaper 530. The class of service 528a may comprise a plurality of individual information flows 508a, 510a, . . . ,512a, and a traffic shaper 530a.

The traffic shaper 530 may perform traffic shaping on the information transmitted among an aggregate of individual information flows 508, 510, . . . ,512. The traffic shaper 530a may perform traffic shaping on the information transmitted among an aggregate of individual information flows 508a, 510a, . . . ,512a.

An information flow may be associated with a specific COS based on information contained in header information contained in frames and/or packets that may be generated by the TOE. The COS may be uniquely identified based on a type of service (TOS) field, for example contained in header information. A plurality of information flows may be associated with a common COS. A COS may identify information flows with common transmission characteristics. For example, a COS may identify information flows for which information is transmitted at a rate that is approximately constant. Another example of a COS may identify information flows for which information is transmitted at a rate that varies but with a specified maximum rate. A COS may also be utilized to identify information flows that utilize one or more protocols. A COS may also identify information flows for which the rate at which information is transmitted is not specified, for example.

In various embodiments of the invention, a traffic shaper 528 may utilize a traffic profile to perform traffic shaping on information transmitted in association with a COS 528. The information transmitted in association with COS 528 may comprise an aggregate of the information transmitted in a plurality of information flows 508, 510, . . . ,512. A subsequent traffic shaper 530a may utilize a traffic profile that is different from that of traffic shaper 530. The information transmitted in association with COS 528a may comprise an aggregate of the information transmitted in a plurality of information flows 508a, 510a, . . . ,512a. For some COSs among the plurality of COSs 528, . . . ,528a, no traffic shaping may be performed.

Figure 5B:
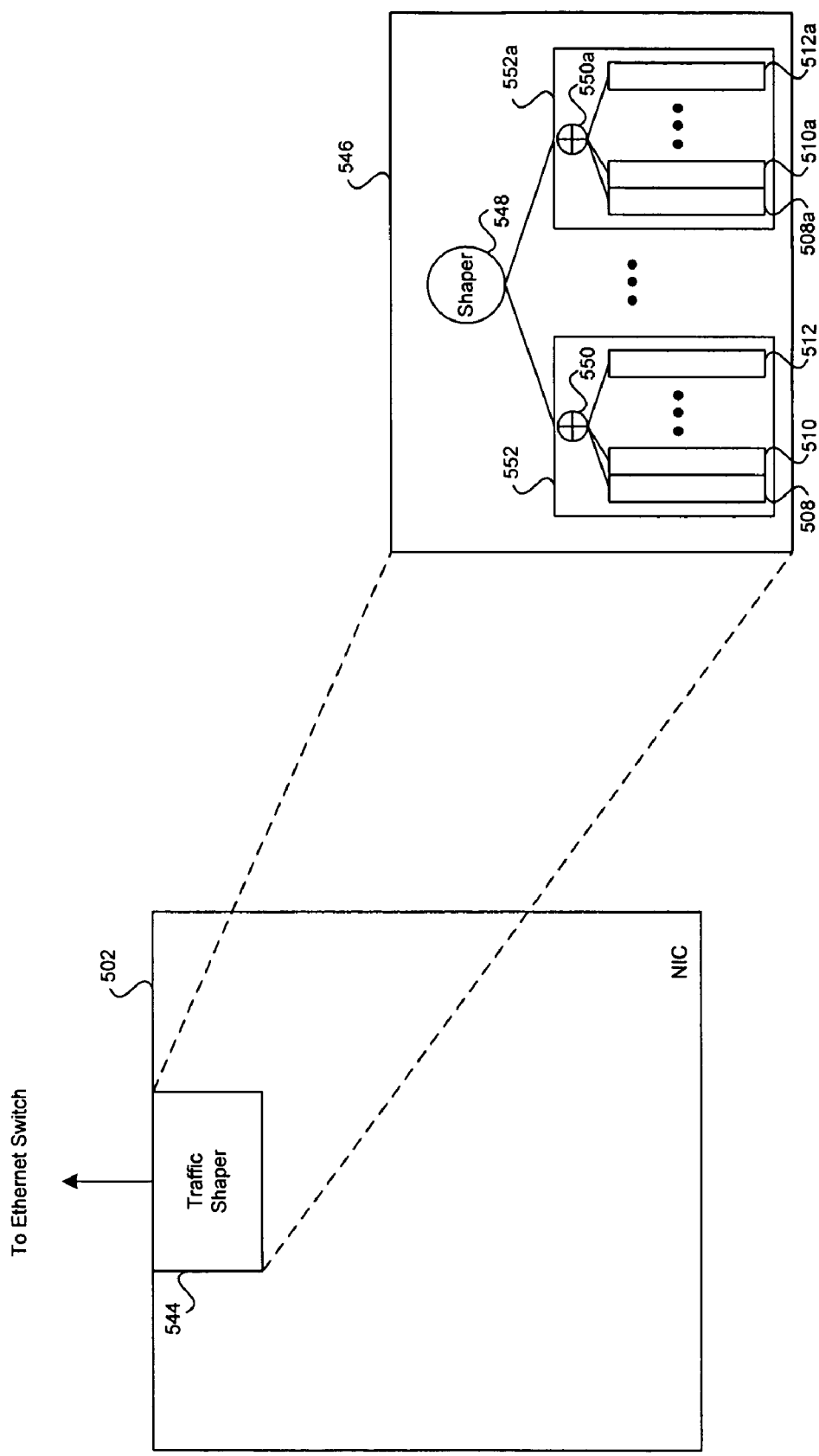
FIG. 5b is a block diagram of an exemplary system that may be utilized to perform traffic smoothing on aggregate NIC traffic, in accordance with an embodiment of the invention.

FIG. 5b is a block diagram of an exemplary system that may be utilized to perform traffic smoothing on aggregate NIC traffic, in accordance with an embodiment of the invention. Referring to FIG. 5b there is shown a NIC 502. The NIC 502 may comprise a traffic shaper 544. The traffic shaper may perform traffic shaping on the aggregate of information flows 546 that may be transmitted by the NIC 502. The aggregate of flows 546 may comprise a traffic shaper 548, a plurality of individual classes of service 552, . . . ,552a. The class of service 552 may comprise a plurality of individual information flows 508, 510, . . . ,512, and a traffic aggregator 550. The traffic aggregator 550 may aggregate information transmitted among a plurality of information flows 508, 510, . . . ,512. The class of service 552a may comprise a plurality of individual information flows 508a, 510a, . . . ,512a, and a traffic aggregator 550a. The traffic aggregator 550a may aggregate information transmitted among a plurality of information flows 508a, 510a, . . . ,512a.

The traffic shaper 548 may perform traffic shaping on the aggregate of information transmitted by the NIC 502 comprising an aggregate among individual COSs 552 and 552a, and among individual information flows 508, 510, . . . ,512, 508a, 510a, . . . ,512a. In various embodiments of the invention, a traffic shaper 548 may utilize a traffic profile to perform traffic shaping on the aggregate of information transmitted by a NIC 502.

Figure 6A:
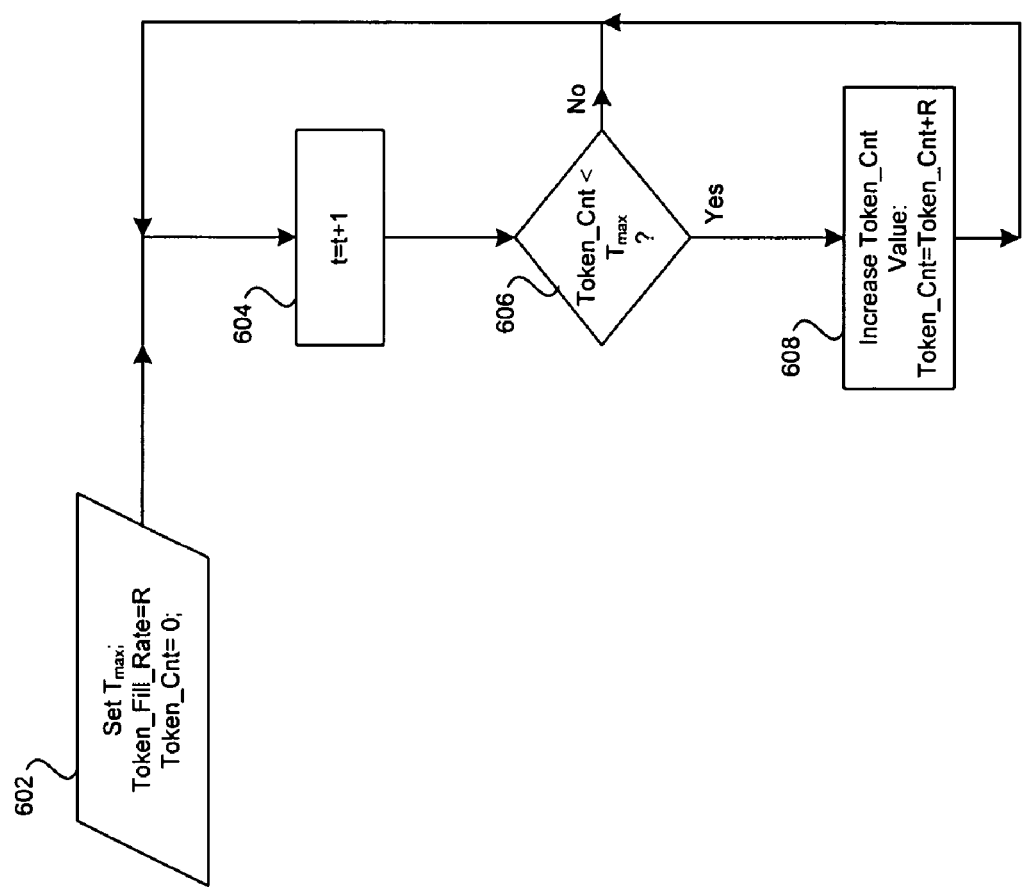
FIG. 6a is a flow chart illustrating steps that may be utilized in an exemplary system for token bucket fill, in accordance with an embodiment of the invention.

FIG. 6a is a flow chart illustrating steps that may be utilized in an exemplary system for token bucket fill, in accordance with an embodiment of the invention. Referring to FIG. 6a, in step 602 state variable, $T_{max}$, may be set to a determined value. The state variable Token_Cnt=0, and Token_Fill_Rate=R. The variable $T_{max}$ may be utilized to determine a maximum number of tokens that may be stored in the token bucket 304. The variable Token_Cnt may be utilized to determine the current number of tokens contained in the token bucket. The variable Token_Fill_Rate may be utilized to determine a rate at which tokens may be added to the token bucket 304.

At step 604 may indicate an elapse of one time unit. Step 606 may determine if the current token count value, token_cnt, has reached a maximum value, $T_{max}$, for the token bucket 304. If the current token count value, token_cnt, has reached the maximum value, $T_{max}$, then step 604 may be next. If the current token count value has not reached the maximum value, $T_{max}$, then the token count value, token_cnt, may be increased by a determined rate, for example, R. Thus, the token count value, token_cnt, may be increased according to:

$$\text{Token\_Cnt} = \text{Token\_Cnt} + R \quad \text{equation [1]}$$

Step 604 may follow.

Figure 6B:
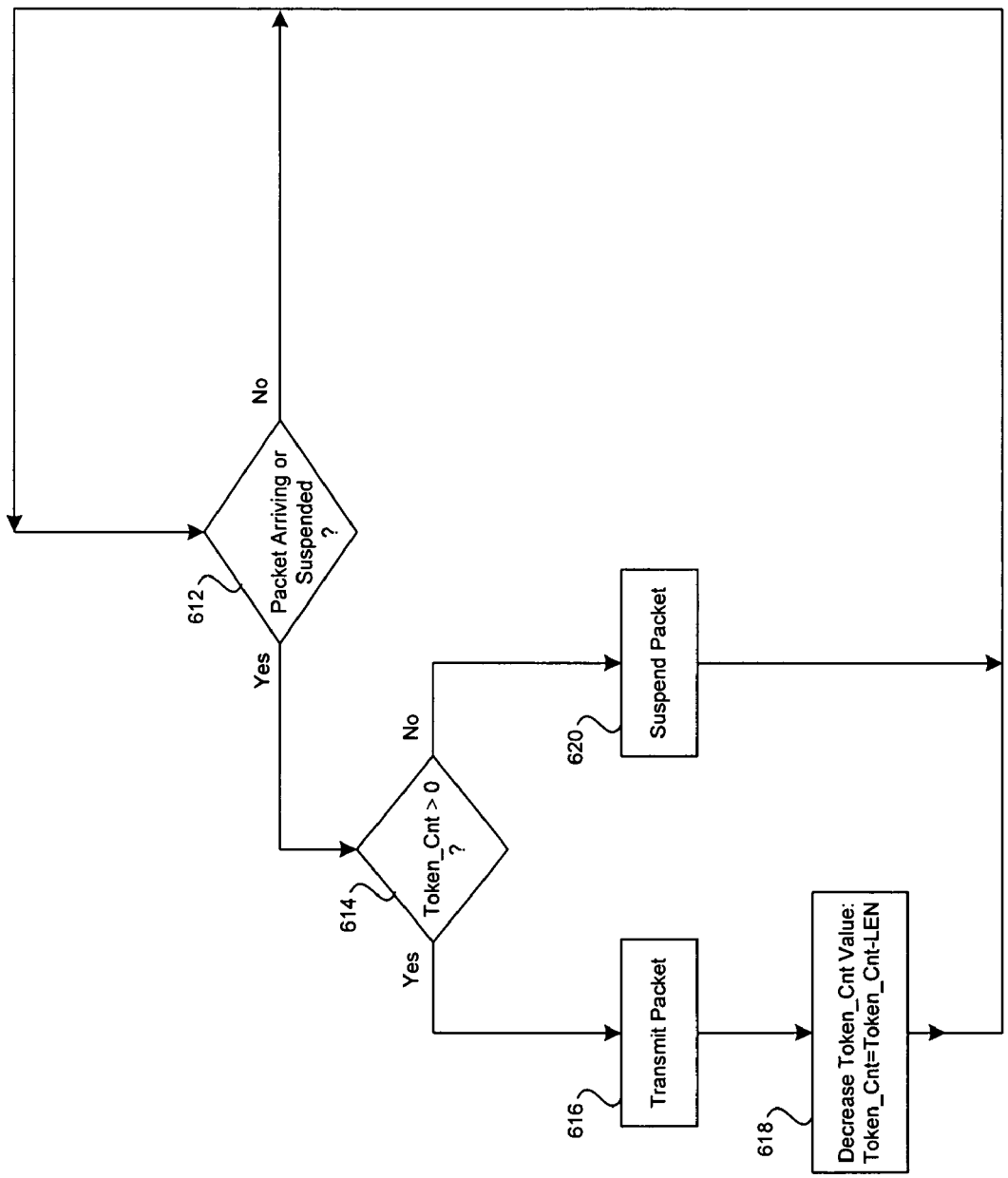
FIG. 6b is a flow chart illustrating steps that may be utilized in an exemplary system for token bucket based TCP traffic smoothing, in accordance with an embodiment of the invention.

FIG. 6b is a flow chart illustrating steps that may be utilized in an exemplary system for token bucket based TCP traffic smoothing, in accordance with an embodiment of the invention. The process flow illustrated in FIG. 6b may be performed concurrently with the process flow illustrated in FIG. 6a, in various embodiments of the invention. Referring to FIG. 6b, step 604 may determine whether a packet has arrived at the TOE 350 for transmission, or whether a packet previously arrived packet has been suspended due to traffic smoothing, in accordance with an embodiment of the invention. If not, the process flow may wait at step 612 until a packet has arrived. If step 612 determines that a packet has arrived or that a packet is currently suspended, step 614 may determine if the current token count value, token_cnt, is greater than 0. If not, then the token bucket may be empty. Consequently, transmission of the packet may be suspended, due to TCP traffic shaping, in step 620. Step 612 may follow. If the token count value, token_cnt, is greater than 0, then step 616 may transmit the packet. Step 618 may decrease the of the token count value, token_cnt, in accordance with the number of binary octets contained in the data frame that may have been transmitted, for example. For example, if the transmitted packet comprises a plurality of octets, LEN, then the token count value, token_cnt, may be decreased according to:

$$\text{Token\_Cnt} = \text{Token\_Cnt} - \text{LEN} \quad \text{equation [2]}$$

Step 612 may follow.

Various embodiments of the invention may provide a method and a system for TCP traffic smoothing. By performing traffic smoothing, large bursts of traffic into a switching device within a network may be averted. This may further result in improved performance for applications that execute at devices, such as computer workstations, personal computers, and servers, which connect to the network. This may also result in lower cost switching devices by enabling a reduction in the amount of memory storage required.

Various embodiments of the invention may not be limited to performing traffic shaping for information transmitted utilizing the transmission control protocol (TCP). Traffic smoothing may comprise the scheduled timing of transmission of information, and may be applied to information transmitted by a TCP offload engine (TOE) for at least one class of service, or on one or more information flows. An information flow may be identified based on a protocol, a source address, a destination address, a source port, a destination port and/or at least one header field associated with higher layer protocols layers 5 through 7 of the OSI protocol reference model. A class of service may comprise one or more information flows. Traffic smoothing may also be applied to an aggregate quantity of information transmitted by a TOE comprising one or more information flows, and/or one or more classes of service. Traffic smoothing also be applied in combinations. For example, traffic smoothing may be applied to one or more information flows, and/or applied to one or more classes of service, and/or applied to an aggregate quantity of information transmitted by a TOE.

Various embodiments of the invention may perform traffic smoothing by determining a quantity of information transmitted by a NIC. The quantity of information transmitted may be measured based on at least a portion of the total number of bits of information that are transmitted by the NIC. For example, traffic smoothing may be performed on a quantity of information comprising one or more entire frames or packets that are transmitted by the NIC, or on a quantity of information comprising a payload portion of each of one or more entire frames or packets.

Figure 7:
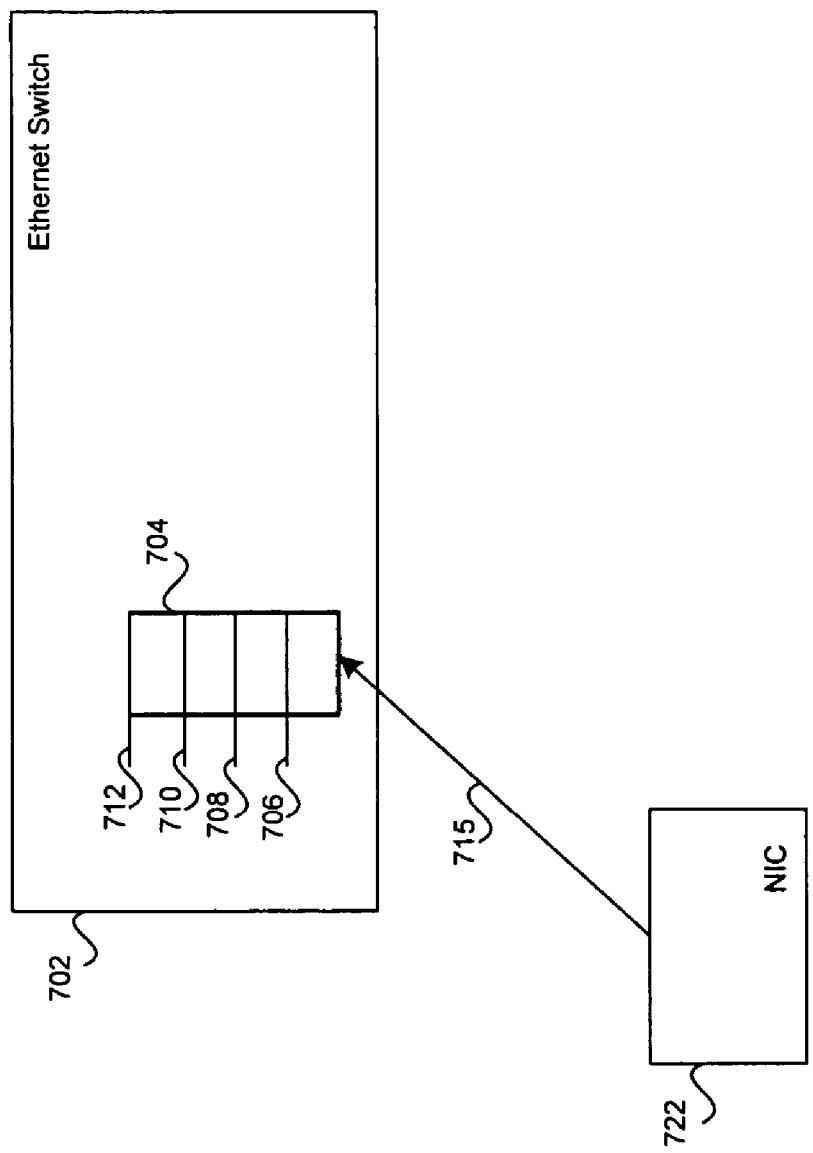
FIG. 7 is a block diagram illustrating ingress switch traffic smoothing, in accordance with an embodiment of the invention.

FIG. 7 is a block diagram illustrating ingress switch traffic smoothing, in accordance with an embodiment of the invention. Referring to FIG. 7, there is shown an Ethernet switch 702, an ingress port 704, a plurality of buffer fill levels 706, 708, 710, 712, an interface 715, and a NIC 722. The NIC 722 may transmit information via interface 715 to the ingress port 704. The ingress port 704 may determine a fill level, comprising buffer fill levels 706, 708, 710, or 712, for example, based upon reception the information from the NIC 722. The fill levels 706, 708, 710, and 712 may indicate corresponding buffer fill levels of ¼, ½, ¾, and FULL respectively, for example. Based on a traffic profile, and on a value of the buffer fill level, the Ethernet switch 702 may communicate a rate control message to the NIC 722. The rate control message may instruct the NIC to reduce a rate at which information is transmitted via the interface 715. The rate control message may instruct the NIC to reduce the rate at which information is transmitted by a rate that corresponds to the buffer fill level. For example for a buffer fill level of 706, 708, 710, or 712, the rate control message may correspondingly instruct the NIC 722 to reduce the rate at which information is transmitted by ¼, ½, ¾, or halt transmission, respectively. For buffer fill levels below buffer fill level 706, no rate control message may be sent. For buffer fill levels between 706 and 708, the rate control message may correspond to the fill level 706. For buffer fill levels between 708 and 710, the rate control message may correspond to the fill level 708. For buffer fill levels between 710 and 712, the rate control message may correspond to the fill level 710. The Ethernet switch 702 may comprise a plurality of ingress ports 704. The Ethernet switch 702 may utilize a traffic profile for one or more ingress ports 704. The Ethernet switch 702 may comprise a plurality of ingress ports, and utilize a corresponding plurality of traffic profiles. The Ethernet switch 702 may utilize a traffic profile in conjunction with information received at the ingress port 704 in association with one or more information flows.

Figure 8:
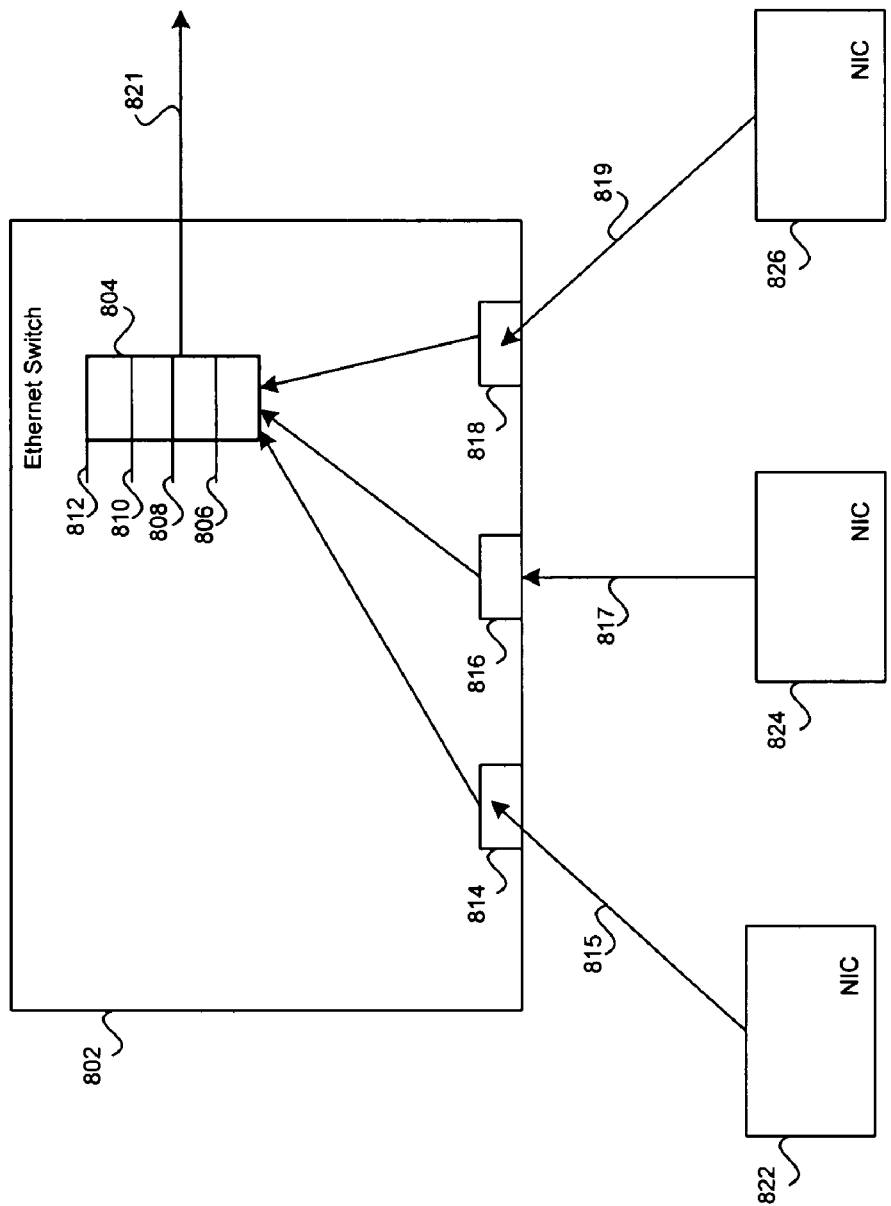
FIG. 8 is a block diagram illustrating egress switch traffic smoothing, in accordance with an embodiment of the invention.

FIG. 8 is a block diagram illustrating egress switch traffic smoothing, in accordance with an embodiment of the invention. Referring to FIG. 8, there is shown an Ethernet switch 708, a plurality of ingress ports 814, 816, 818, an egress port 804 a plurality of buffer fill levels 806, 808, 810, 812, a plurality of interfaces 815, 817, 819, and a plurality of NICs 822, 824, 826. The NIC 822 may transmit information via interface 815 to the ingress port 814. The NIC 824 may transmit information via interface 817 to the ingress port 816. The NIC 826 may transmit information via interface 819 to the ingress port 818. The Ethernet switch 802 may direct information received via any of ingress ports 814, 816, 818, to be transmitted via the egress port 804. The Ethernet switch 802 may transmit information from the egress port 804 via interface 821. The egress port 804 may determine a buffer fill level, comprising fill levels 806, 808, 810, or 812, for example, based upon reception the information from any of the ingress ports 814, 816, 818. The buffer fill levels 806, 808, 810, and 812 may represent buffer fill levels corresponding to the buffer fill levels 706, 708, 710, and 712 respectively, for example. Based on a traffic profile, and on a value representative of the buffer fill level, the Ethernet switch 802 may communicate a rate control message to any of the NICs 822, 824, 826. The rate control message may instruct the NIC to reduce a rate at which information is transmitted to the Ethernet switch via the corresponding interface. The rate control message may instruct the NIC to reduce the rate at which information is transmitted by a rate that corresponds to the buffer fill level. For example, for a buffer level of 806, 808, 810, or 812, the rate control message may correspondingly instruct a NIC to reduce the rate at which information is transmitted by ¼, ½, ¾, or halt transmission, respectively. For buffer fill levels below buffer fill level 806, no rate control message may be sent. For buffer fill levels between 806 and 808, the rate control message may correspond to the fill level 806. For buffer fill levels between 808 and 810, the rate control message may correspond to the fill level 808. For buffer fill levels between 810 and 812, the rate control message may correspond to the fill level 810. The rate control message may be sent to one NIC or to a plurality of NICs based on the degree to which information transmitted by the NIC, and received at the corresponding ingress port, has contributed to the level of buffer fill at the egress port 804.

The Ethernet switch 802 may comprise a plurality of egress ports 804. The Ethernet switch 802 may utilize a traffic profile in association with one or more ingress ports 814, 816, 818. The Ethernet switch 802 may comprise a plurality of ingress ports and egress ports, and utilize a corresponding plurality of traffic profiles based on combinations of ingress and egress ports. The Ethernet switch 802 may utilize a traffic profile in conjunction with information received at of the ingress ports 814, 816, 818, and transmitted via an egress port 804. The Ethernet switch 802 may utilize a traffic profile in association with one or more information flows received via an ingress port, and transmitted via an egress port.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for controlling data transmission in a communications system, the method comprising:
    scheduling timing of transmission of information from a TCP offload engine based on a traffic profile, wherein said scheduling comprises transmitting said information at a rate that is one of: greater than a rate at which said information was generated, approximately equal to a rate at which said information was generated, and less than a rate at which said information was generated; and
    decreasing a token count based on said transmitting information.

2. The method according to claim 1, comprising increasing said token count based on a determined rate.

3. The method according to claim 2, comprising setting a maximum value for said token count.

4. The method according to claim 2, comprising determining whether to suspend or transmit a current packet based on a current value of said token count.

5. The method according to claim 1, wherein said scheduled timing of transmission is based on one or both of: a class of service, and at least one information flow.

6. The method according to claim 5, wherein said information flow comprises one or more of: a protocol, a source address, a destination address, a source port, and a destination port and at least one header field associated with higher layer protocols layers 5 through 7 of the OSI protocol reference model.

7. A system for controlling data transmission in a communications system, the system comprising:

one or more processors that are communicatively coupled to a memory and a TCP offload engine, wherein said one or more processors are operable to schedule timing of transmission of information from said TCP offload engine based on a traffic profile, wherein said scheduling comprises transmitting said information at a rate that is one of: greater than a rate at which said information was generated, approximately equal to a rate at which said information was generated, and less than a rate at which said information was generated, wherein said one or more processors is operable to decrease a token count based on said transmitting information.

8. The system according to claim 7, wherein said one or more processors is operable to increase said token count based on a determined rate.

9. The system according to claim 8, wherein said one or more processors is operable to set a maximum value for said token count.

10. The system according to claim 8, wherein said one or more processors is operable to determine whether to suspend or transmit a current packet based on a current value of said token count.

11. The system according to claim 7, wherein said scheduled timing of transmission is based on one or both of: a class of service, and at least one information flow.

12. The system according to claim 11, wherein said information flow comprises one or more of: a protocol, a source address, a destination address, a source port, and a destination port.

13. A computer readable medium having stored thereon, a computer program having:

at least one code section for controlling data transmission in a communications system, the at least one code section being executable by a computer for causing the computer to perform steps comprising: scheduling timing of transmission of information from a TCP offload engine based on a traffic profile;

code for transmitting said information at a rate that is one of: greater than a rate at which said information was generated, approximately equal to a rate at which said information was generated, and less than a rate at which said information was generated; and code for decreasing a token count based on said transmitting information.

14. The computer readable medium according to claim 13, further comprising code for increasing said token count based on a determined rate.

15. The computer readable medium according to claim 14, further comprising code for setting a maximum value for said token count.

16. The computer readable medium according to claim 14, further comprising code for determining whether to suspend or transmit a current packet based on a current value of said token count.

17. The computer readable medium according to claim 13, wherein said scheduled timing of transmission is based on one or both of: a class of service, and at least one information flow.

18. The computer readable medium according to claim 17, wherein said information flow comprises one or more of: a protocol, a source address, a destination address, a source port, a destination port and at least one header field associated with higher layer protocols layers 5 through 7 of the OSI protocol reference model.

* * * * *

UNITED STATES PATENT AND TRADEMARK OFFICE
CERTIFICATE OF CORRECTION

PATENT NO.      : 7,643,420 B2  
APPLICATION NO. : 11/187404  
DATED           : January 5, 2010  
INVENTOR(S)     : Kwan et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1105 days.

Signed and Sealed this

Sixteenth Day of November, 2010

David J. Kappos  
*Director of the United States Patent and Trademark Office*